United States Patent Office 3,527,787
Patented Sept. 8, 1970

3,527,787
PROCESS FOR THE MANUFACTURE
OF ACRYLONITRILE
Herbert Baader, Hermulheim, near Cologne, Kurt Sennewald, Knapsack, near Cologne, and Helmut Reis, Hurth, near Cologne, Germany, assignors to Knapsack Aktiengesellschaft, Knapsack, near Cologne, Germany, a corporation of Germany
No Drawing. Filed Dec. 27, 1967, Ser. No. 693,709
Claims priority, application Germany, Jan. 31, 1967, K 61,312
Int. Cl. C07c 121/32
U.S. Cl. 260—465.9      7 Claims

ABSTRACT OF THE DISCLOSURE

Production of acrylonitrile by catalytic dehydrochlorination of β-chloropropionitrile, comprising heating the β-chloropropionitrile in contact with an alkyl-phosphine and/or aryl-phosphine and/or their hydrochlorides, dihydrochlorides, dichlorides or quaternary phosphonium chlorides as a catalyst and distilling off the resulting dehydrochlorination products comprised of hydrogen chloride and acrylonitrile.

---

The present invention relates to a process for the production of acrylonitrile by catalytic dehydrochlorination of β-chloropropionitrile.

Acrylonitrile is widely used in industry as a monomer and co-monomer. It is most frequently produced by catalytic processes, such as by additive combination of hydrogen cyanide with acetylene or by simultaneous reaction of propylene, ammonia and oxygen, as well as by dehydration of lactonitrile. Further interesting processes are those in which propionitrile, obtained, for example, as a by-product originating from the dehydration of lactonitrile, is used as the starting material. Still further, propionitrile can be produced from propylene, propane, propionic acid, propionaldehyde and propyl alcohol. As propionitrile practically has not been used commercially heretofore, it is predominantly chlorinated to give β-chloropropionitrile which is subsequently dehydrochlorinated to be transformed into acrylonitrile.

The dehydrochlorination has been disclosed, for example, in connection with the pyrolysis of α-chloropropionitrile at 600° C., which is accompanied, inter alia, by the formation of β-chloropropionitrile accessible to dehydrochlorination by means of alkalis, such as NaOH, Na₂CO₃ or NaHCO₃. In a still earlier process, chloropropionitrile is dehydrochlorinated in the vapor phase at 300° C. with the addition of equivalent proportions of methyl alcohol on aluminum oxide as a catalyst and with the simultaneous formation of methyl chloride. While the first of the above two processes has been found to consume sodium bicarbonate and to produce useless sodium chloride, the disadvantage associated with the catalytic processes is seen to reside in the use of high temperatures and in the fact that substances added for dilution of the gas phase are required to be distilled off subsequently from the acrylonitrile.

It has now been found that the difficulties reported above can be obviated by the process of the present invention which comprises heating β-chloropropionitrile in contact with an alkyl- and/or aryl-phosphine and/or their hydrochlorides, dihydrochlorides, dichlorides or quaternary phosphonium chlorides as a catalyst and distilling off the resulting dehydrochlorination products comprised of hydrogen chloride and acrylonitrile. The dehydrochlorination can be carried out under pressures between about 1 and 10 atmospheres absolute. To this end, it is advantageous to heat a mixture comprised of β-chloropropionitrile and catalyst to a temperature between about 150 and 250° C. For example, the mixture of β-chloropropionitrile and catalyst can be reflux-boiled, preferably at atmospheric pressure, at temperatures between about 160 and 190° C. Especially useful catalysts are trialkyl phosphine or triaryl phosphine, but alkyl-phosphines containing 4 to 18 carbon atoms per alkyl group can, however, also be used. The reaction zone is generally supplied with about 0.5 to 20, preferably 1 to 10, parts by weight catalyst, per 100 parts by weight β-chloropropionitrile.

The following alkyl radicals can be used as the "alkyl" in the alkyl phosphines: n-butyl, iso-butyl, n-pentyl, n-hexyl, n-heptyl, n-octyl, n-nonyl, n-decyl, n-undecyl, n-dodecyl (lauryl), palmityl, stearyl, and further isomeric and homologous alkyls. The di- and trialkyl-phosphenes may also contain different alkyl groups. Triphenyl-phosphine, which is easy to handle as a result of its good stability to the action of atmospheric oxygen, is the preferred aryl-phosphine, but the various tritolyl or trixylyl phosphines can be used as well. The alkyl or aryl phosphines or their hydrochlorides (e.g. triphenyl phosphine·HCl, triphenyl-phosphine·2 HCl), dichlorides (e.g. triphenyl-phosphine dichloride) or quaternary phosphonium chlorides act as true catalysts in the process of the present invention, and every catalyst molecule causes the dehydrochlorination of a plurality of β-chloropropionitrile molecules. The process of the present invention can be carried out by adding to the reaction mixture no more than a suitable tertiary phosphine, the hydrochlorides and quarternary phosphonium chloride (e.g. triphenyl-(β-cyano-ethyl)-phosphonium chloride) forming automatically in the presence of hydrogen chloride or β-chloropropionitrile.

The reaction temperature depends on the pressure selected, the reaction being preferably carried out at the boiling temperature of the β-chloropropionitrile used.

The process of the present invention can be carried out in either a flow reactor with subsequent distillative work-up or more preferably in a distilling apparatus, which enables the β-chloropropionitrile to be completely transformed and pure acrylonitrile to be obtained at the column head by suitable regulation of the acrylonitrile reflux.

As compared with the expense entailed by pyrolytic processes, which are carried out at high temperatures, it is particularly the use of a distilling apparatus that enables energy and apparatus costs to be economized, as the necessary acrylonitrile distillation and the dehydrochlorination are carried out in one and the same apparatus.

It is an interesting result that the reverse reaction, i.e. the additive combination of hydrogen chloride with acrylonitrile, is almost completely obviated under the reaction conditions in the presence of triphenyl-phosphine.

In the absence of triphenyl-phosphine, however, the step of contacting hydrogen chloride with acrylonitrile, for example, in the receiver of the distilling apparatus, will be found to result at once in partial retransformation of β-chloropropionitrile. It is also an unexpected result that the acrylonitrile in contact with β-chloropropionitrile substantially has no tendency to undergo polymerization or cyanoethylation, in the presence of triphenyl-phosphine. The acrylonitrile obviously escapes at once from the reaction mixture as a result of its boiling point (77.3° C.) which is substantially lower than that of β-chloropropionitrile (B.P.: 175° C.); in the presence of the catalyst, the concentration of acrylonitrile and accordingly its tendency to undergo dimerization and polymerization are but small.

EXAMPLE 40 grams triphenyl-phosphine were dissolved in about 0.5 liter β-chloropropionitrile and the resulting solution was heated to boiling in a distilling apparatus having a fractionating means mounted thereon (temperature prevailing in bottom portion: 163° C.). Resulting hydrogen chloride and acrylonitrile distilled off overhead and material accumulating in the bottom portion was maintained constant by the supply of fresh β-chloropropionitrile. A total of 15.58 mols β-chloropropionitrile was supplied during 4.5 hours and 11.99 mols acrylonitrile, which had been condensed previously, were removed in liquid form near the column head, while 12.46 mols gaseous hydrogen chloride were simultaneously absorbed in water. At the end of the experiment, the bottom portion of the distilling apparatus was found still to contain a "hold-up" of 3.12 mols unreacted β-chloropropionitrile and 66 grams of a residue suitable for further use as a catalyst. Acrylonitrile was accordingly obtained in a yield of 96%, referred to the β-chloropropionitrile transformed. The catalyst productivity was found to be 17.5 mols acrylonitrile per hour per mol β-chloropropionitrile.

We claim:

1. A process for preparing acrylonitrile by catalytic dehydrochlorination of β-chloropropionitrile; which comprises heating β-chloropropionitrile at abut 150°–250° C. in the presence of a catalytic amount of a member selected from the group consisting of an alkylphosphine containing 4–18 carbon atoms in the alkyl moiety, phenylphosphine, tolyl phosphine, xylyl-phosphine, their corresponding hydrochlorides, dihydrochlorides, dichlorides and quaternary phosphonium chlorides; and distilling off the acrylonitrile and by-products substantially as formed.

2. The process of claim 1 wherein the catalyst is a member selected from the group consisting of trialkyl-phosphine containing 4 to 18 carbon atoms per alkyl group, triphenylphosphine, tritolyl-phosphine and trixylyl-phosphine.

3. The process of claim 1, wherein the dehydrochlorination is carried out under pressures between about 1 and 10 atmospheres absolute.

4. The process of claim 1, wherein the mixture comprised of β-chloropropionitrile and catalyst is reflux-boiled.

5. The process of claim 4, wherein the said mixture is reflux-boiled at atmospheric pressure, at temperatures between about 160 and 190° C.

6. The process of claim 1, wherein the reaction is affected with about 0.5 to 20 parts by weight catalyst per 100 parts by weight β-chloropropionitrile.

7. The process of claim 6, wherein the reaction is effected with 1 to 10 parts by weight catalyst per 100 parts by weight β-chloropropionitrile.

References Cited

UNITED STATES PATENTS

| 2,174,756 | 10/1939 | Pieroh | 260—465.9 |
| 2,467,373 | 4/1949 | Dutcher et al. | 260—465.9 |

JOSEPH P. BRUST, Primary Examiner

U.S. Cl. X.R.

260—465.7